United States Patent
Pennock et al.

(10) Patent No.: US 8,750,539 B2
(45) Date of Patent: Jun. 10, 2014

(54) CHARGE PUMP CIRCUITS

(75) Inventors: John Laurence Pennock, Midlothian (GB); John Bruce Bowlerwell, Peterhead (GB)

(73) Assignee: Wolfson Microelectronics plc, Edinburgh (GB)

( * ) Notice: Subject to any disclaimer, the term of this patent is extended or adjusted under 35 U.S.C. 154(b) by 967 days.

(21) Appl. No.: 12/649,879

(22) Filed: Dec. 30, 2009

(65) Prior Publication Data

US 2010/0166229 A1 Jul. 1, 2010

(30) Foreign Application Priority Data

Dec. 30, 2008 (GB) .................................. 0823653.1

(51) Int. Cl.
*H04R 3/00* (2006.01)
(52) U.S. Cl.
USPC ............ 381/122; 381/111; 330/297; 361/235
(58) Field of Classification Search
USPC ................... 327/536; 361/111, 235; 381/122, 381/111–113
See application file for complete search history.

(56) References Cited

U.S. PATENT DOCUMENTS

| | | | |
|---|---|---|---|
| 5,654,862 A * | 8/1997 | Worley et al. ................. | 361/111 |
| 6,147,547 A | 11/2000 | Ogura et al. | |
| 6,404,271 B2 * | 6/2002 | Ayres ............................ | 327/536 |
| 6,816,000 B2 * | 11/2004 | Miyamitsu .................... | 327/536 |
| 2006/0006950 A1 * | 1/2006 | Burns et al. ................... | 330/311 |
| 2008/0219474 A1 * | 9/2008 | Deruginsky et al. .......... | 381/111 |

* cited by examiner

*Primary Examiner* — Disler Paul
(74) *Attorney, Agent, or Firm* — Dickstein Shapiro LLP

(57) ABSTRACT

Charge pump circuits having circuit components such as transistors which may be damaged by voltage transients greater than the normal operating voltage levels of the charge pump circuit, such as may be experienced during powering down. The circuit components to be protected are connected in parallel with a leakage element arranged to have a leakage current that is small enough during normal operation to allow the charge pump to operate effectively but which is large enough, during development of a voltage transient, to prevent excess voltage levels being achieved. The leakage element may have a significant leakage current at a voltage less than the breakdown voltage of the circuit component. Suitable leakage elements are poly diodes.

27 Claims, 10 Drawing Sheets

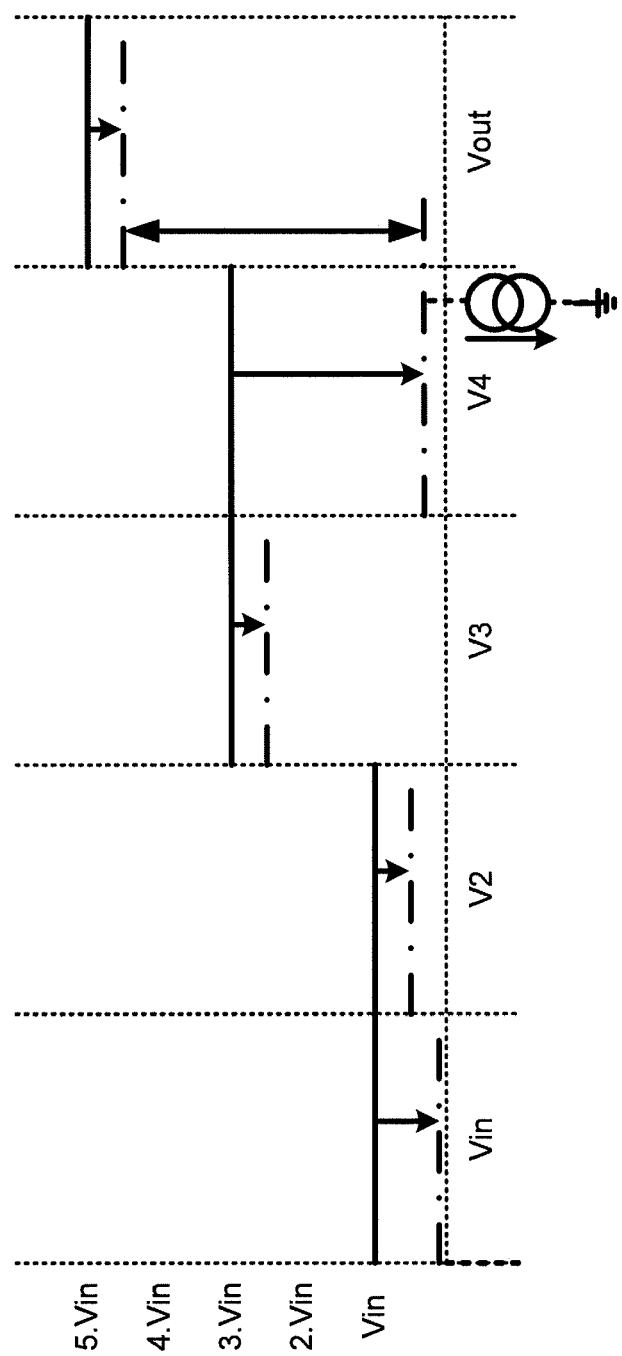

CHARGE PUMP CIRCUITS

BACKGROUND OF THE INVENTION

1. Field of the Invention

The present invention relates to charge pump circuits having leakage elements arranged to act as protective shunt elements across low-voltage semiconductor devices, and in particular, but not exclusively, to such circuits having high impedance diodes with current leakage characteristics.

2. Description of the Related Art

Capacitive charge pumps and their use in generating higher voltages from a lower-voltage power supply are well known. Their use is increasing due to the proliferation of battery-powered consumer gadgets such as MP3 players and mobile phones. For example one use is to provide a voltage for MEMS microphone transducers, where a 12V transducer bias voltage may need to be derived from a supply as low as 1.5V.

FIG. 1a illustrates a general capacitive charge pump comprising four pumped capacitors C1 to C4 interposed between switching stages SS1 to SS4. In operation, the voltages on the bottom plates of C1 to C4 are pulsed between an input voltage Vin and ground in alternate clock phases. The top plate of each capacitor is also connected to the top plate of an adjacent capacitor via a switching stage SS2-4. The first capacitor in the chain is also linked via switching stage SS1 to another voltage signal which is also conveniently equal to Vin. Each capacitor top plate cycles between a respective pair of voltages, with these voltages increasing along the chain, in this case delivering an output voltage of 6V to the last, unswitched, capacitor C4.

The switch elements may be simple diodes, as in the well known Dickson charge pump, but for higher efficiency and a more accurate output voltage they may be MOS switch transistors, driven, via level shift circuits LS1 to LS4 by another set of clock pulses to connect adjacent pairs of capacitors together in alternate clock phases.

FIG. 1b illustrates the voltage levels at the nodes of the switching stages with the solid and dashed lines indicating the voltage levels achieved during different stages of the clock cycle. Thus the voltage at Vin is constant. However the voltage at V2 alternates between Vin and 2Vin. Similarly the voltage at V3 varies between 2Vin as a low voltage and 3Vin as a high voltage, but with the pattern of high and low voltage being of opposite phase to that at node V2. It can be seen from FIG. 1b that the voltage difference across each switch element when off never exceeds twice the input voltage Vin. It is thus possible to construct such a charge pump using devices designed only to operate with up to 2.Vin across them. This has advantages in that these devices are smaller than higher voltage devices, so occupy less chip area and need less charge to turn on and off each clock cycle. In many applications, such as the above-mentioned MEMS microphone transducer application, other electronics present in the device do not require high-voltage transistors, so a simpler cheaper silicon fabrication process with only low-voltage transistors can be used in manufacture.

Using low-voltage transistors as the switches does require some extra circuitry to shift the voltage levels of the driving switch waveforms from near ground to near the increasing voltage levels of each stage, possibly using more switched capacitors to level-shift these voltages. However such circuitry is relatively simple.

In steady state, the voltage waveforms in each part of the circuit and across each transistor are predictable, and excessive voltages can be avoided by appropriate design.

However in other scenarios, for example in power-down, it is hard to predict all possible power-down transients, as these will depend on the timing and the speed of the powering down of the supply, and the output of any clock waveform generator in all possible cases. If the supply disappears suddenly, the switches may find themselves stuck in one phase, or possibly all turned off. In such a case, at least some of the capacitors may be at high voltages, and only decay to ground gradually via small leakage currents associated with junctions to which they are connected. But processing variations across a circuit, or differences in circuit design at different nodes may result in some node voltages decaying faster than others. For example the final capacitor is often much larger than the others to reduce ripple on Vout, so this may decay more slowly, unless the applied load is still taking current. This is illustrated in FIG. 1c, which shows the voltage levels at one clock phase (solid line) and the voltage decay a certain time later (dot-dash line). In this example C3 is shown as decaying to ground much quicker than C4, perhaps also due to a minor defect in a junction coupled to C3 increasing its leakage to ground. In this example a large voltage develops between C3 and C4, across switch block SS4.

Such a large voltage may damage constituent elements of SS4, for instance the voltage may be above the breakdown voltage of any transistor elements and exceeding the breakdown voltage may stress the transistors to breaking point, especially if repeated often. Such power cycling is becoming more prevalent as more complex power management schemes are employed in portable equipment to reduce power consumption. Also as silicon technology evolves to use smaller transistors economically, there is generally less safety margin possible, so the transistors are more fragile than in older technologies.

Similar issues of possible high voltages may arise not only across the switch elements, but also in the capacitor level-shifting circuits LS1 to LS4. Internal voltages in such circuits may not be predictable in power down scenarios and again large voltages may lead to lifespan reduction or failure.

Further if the device does not power down properly, there may be peculiar transients on power-up which could again cause damage to the device.

There is thus a requirement for some means of ensuring that excessive voltages do not develop across low-voltage elements in these charge pumps, especially at nodes that are capacitively pumped and so may not always be directly driven high or low, and may be at high voltages before power down.

It is therefore an aim of the present invention to provide a charge pump circuit which mitigates at least some of the aforementioned disadvantages.

SUMMARY OF THE INVENTION

According to a first aspect of the present invention, there is provided a charge pump circuit comprising: at least one component that may be damaged by voltage transients above the normal operating voltages of the circuit; and a leakage element electrically connected in parallel with said at least one component so as to protect said component from voltage transients above the normal operating voltages of the circuit.

The present invention provides a leakage element connected in parallel with a circuit component of the charge pump circuit in order to protect said circuit component from voltage transients which are above the normal operating voltages of the circuit. As described above a charge pump circuit may be designed using transistors that are capable of operating at the normal operating voltages of the charge pump, but that certain events may lead to voltage transients which generate greater than normal applied voltages that may damage the transistors. The circuit component may therefore comprise a transistor, and the invention will be described in relation to protection of transistors. However the principles of the invention apply to protecting other circuit components that may be damaged by such voltage transients.

A leakage element is an element that, whilst generally having the property of preventing current flow (at least in one direction) nevertheless allows a small current to leak through the barrier presented by the leakage element. The leakage elements used in the present invention are thus arranged to allow a leakage current to flow, i.e. a current which, in normal operating conditions is not significant enough to prevent satisfactory operation of the charge pump but, in the event of a developing voltage transient, allows sufficient current to flow to maintain a safe applied voltage. The skilled person will appreciated that leakage elements are high impedance elements, at least as regards current flow from a higher voltage to a lower voltage stage of the charge pump, so as to prevent excess current flow in normal operation.

The leakage element is preferably adapted so as to minimise the chance of the transistor exceeding its breakdown voltage. The leakage element is therefore conveniently adapted to allow a leakage current to flow at a voltage below the breakdown voltage of the transistor, i.e. it is adapted to prevent a voltage difference developing across the transistor which is greater than the breakdown voltage of the transistor. The transistors may, as described above, be relatively low voltage elements and have a breakdown voltage less than the voltage output of the charge pump circuit.

The leakage element may therefore be adapted to allow a leakage current of more than 100 pA or more than 1 nA or more than 10 nA or more than 100 nA at a voltage less than the breakdown voltage of the transistor. The leakage element may be adapted to allow a leakage current of around 1 μA to flow. For instance if the safe operating voltage of the transistor was around 3V for example, the leakage element may be adapted to allow a leakage current of greater than 1 nA or greater than 10 nA or greater than 100 nA or around 1 μA to flow at a voltage around 3V. Such a leakage current would quickly drain charge from the high voltage stage and maintain charge on the low voltage stage so as to minimise the voltage difference and hence prevent the voltage across the transistor from exceeding the breakdown voltage.

Equally however the leakage element should not allow too great a current to flow in normal operation. Therefore the leakage element may be adapted to allow a leakage current of less than 1 μA or less than 100 nA or less than 10 nA at the normal maximum operating voltage. For example the leakage element may be arranged to have a leakage current of around 1 nA at the maximum normal operating voltage difference of the charge, i.e. 2Vin in the example given in the introduction.

The leakage element may comprise a polysilicon diode, i.e. a diode formed in polycrystalline silicon. As will be described in more detail below polysilicon diodes have the desired impedance and leakage characteristics. In one embodiment therefore the invention relates to a charge pump circuit having at least one circuit component electrically connected in parallel with a polysilicon diode.

Conveniently the polysilicon diode is a p-i-n diode. As described in more detail later the presence of an intrinsic region can overcome grain boundary effects which arise in a polysilicon diode with n and p regions in direct contact. However other pin diodes may be suitable for use in the present invention and in another embodiment the invention provides a charge pump circuit having at least one circuit component electrically connected in parallel with a pin diode.

The polysilicon diode may comprise a diode having a single pin (or pn) junction or may comprise a multiple junction composite diode. Such a multiple junction composite diode may comprise a continuous structure of polysilicon comprising a plurality of regions of first semiconductor type, being n type or p type, and at least one region of a second semiconductor type, being n type or p type and the opposite type to the first type, the regions of first semiconductor type and second semiconductor type being arranged alternately. The continuous structure may further comprise a plurality of regions of a third semiconductor type, said third semiconductor type being one or more of substantially intrinsic, lightly doped p-type or lightly doped n-type, arranged between respective regions of first semiconductor type and regions of second semiconductor type. There may be a plurality of regions of second semiconductor type.

In other words the composite diode is has an alternating arrangement of n type and p type regions, preferably separated by substantially intrinsic regions (formed from intrinsic material or lightly doped material). Such a composite diode thus comprises a plurality of pn and np (or pin/nip) junctions. Each such junction can be thought of as effectively comprising a diode arranged in electrical series with the other junction diodes. By appropriate choice of the number of junctions the characteristics of the overall composite diode can be varied to match the desired characteristics.

It should be noted that it is possible to use a composite junction diode which is symmetric. For instance a composite diode with p and n type regions arranged alternately and having a p type region at each end (or an n type region at each end) will have an equal number of pn junctions as np junctions. The dc characteristics of such a device are symmetric and thus the device does not have distinct forward and reverse bias modes. The term diode as used herein is not therefore restricted to devices which have distinct forward and reverse characteristics In order to provide the desired characteristic the leakage element may comprise a plurality of diodes electrically connected across the circuit component to be protected, for example a transistor. For instance the plurality of diodes may be electrically connected in series.

As described above charge pumps typically have a plurality of stages and a transistor may be electrically connected between adjacent stages of the charge pump. Conveniently the leakage element is arranged to be reverse biased when the later stage of the charge pump, i.e. the stage closer to the output, is at a higher voltage than the earlier stage of the charge pump. As described above adjacent stages of the charge pump may be at the same voltage during one clock period and then at a voltage difference of say 2Vin during a different clock period, with the voltage on the later stage being higher than that at the earlier stage. The leakage element is arranged such that it is reverse biased when the later stage is at a higher voltage than the earlier stage.

Note that, as described above, the leakage element may comprise a polysilicon diode will a symmetric dc characteristic and such a diode does not have distinct forward and reverse directions. As used herein the term reverse bias means that the diode is arranged so that the current flow under normal operating conditions is the same or less than the current flow that would be observed were the diode to be connected the other way around.

The transistor protected by the leakage element may be part of a switching stage for switchably connecting a capacitor of one stage of the charge pump to a previous stage of the charge pump or to the input voltage to the charge pump. Additionally or alternatively a transistor protected by a leakage element may be part of a level shifting cell of the charge pump circuit. The circuit may have a plurality of transistors, each electrically connected in parallel with a leakage element.

The output of charge pump may be electrically connected to a biasing circuit for biasing a device. The device may be a transducer such as a MEMS microphone. Such a MEMS microphone may be used in a variety of applications including, but not limited to an ultrasound imager, a sonar transmitter and/or receiver, a mobile phone or other communication device, a personal desktop assistant, an MP3 player or other personal audio device or a laptop computer.

In another aspect of the present invention there is provided a method of protecting a circuit component in a charge pump from voltage levels higher than normal operating voltages comprising the step of arranging a leakage element in parallel with said circuit component. The circuit component may comprise a transistor and the transistor may have a breakdown voltage less than the voltage output of the charge pump circuit. The leakage element may be adapted to prevent a voltage across the transistor which is greater than the breakdown voltage of the transistor The leakage element may comprise a polysilicon diode. The polysilicon diode may be a multiple junction composite diode, comprising a continuous structure of semiconducting material comprising a plurality of regions of first semiconductor type, being n type or p type, and at least one region of a second semiconductor type, being n type or p type and the opposite type to the first type, the regions of first semiconductor type and second semiconductor type being arranged alternately The leakage element may comprise a pin diode.

The leakage element may comprise a plurality of diodes connected in series and/or parallel.

BRIEF DESCRIPTION OF THE DRAWINGS

For a better understanding of the present invention, and to show more clearly how it may be carried into effect, reference will now be made, by way of example, to the following drawings, in which:

FIG. 1b illustrates the voltage levels experienced at various nodes of the circuit of FIG. 1a;

FIG. 1c shows an example of voltage levels that may be developed on power down in the circuit of FIG. 1a;

FIG. 2b illustrates an example of voltage levels that may be developed on power down in the embodiment shown in FIG. 2a;

FIG. 3b illustrates the current voltage characteristics of the poly diode shown in FIG. 3a;

DETAILED DESCRIPTION OF THE PREFERRED EMBODIMENTS

FIG. 2 shows a charge pump architecture embodiment according to an aspect of the invention. The circuit operates in the same manner, and is similar in arrangement to a convention charge pump circuit such as that shown in FIG. 1, but with the addition of leakage elements, diode clamp devices D1 to D4, across consecutive switch blocks SS1 to SS4, between consecutive pump capacitors C1 to C4. The diodes clamp devices each comprise a diode arranged to be reverse biased in terms of current flow from a higher voltage stage of the charge pump to a lower voltage stage of the charge pump.

As described above, in normal operation, the voltage difference across each switching stage will be either zero or 2Vin. Thus, except for brief transients, these diodes will either be at zero bias or reverse biased by 2.Vin. In the event of a power down the capacitors will begin to discharge. In the example described above in relation to FIG. 1c a leakage current associated with capacitor C3 caused it to discharge faster than capacitor C4—leading to a high voltage difference. In the present invention however, as shown in FIG. 2b, provided that the diode leakage current characteristics are such that it presents more leakage than is likely in even a mildly defective junction on a relevant diode node, then the clamp diode leakage will dominate and prevent a large voltage building up between C3 and C4.

In other words the diodes D1-D4 act to protect each switching stage during a power-down shut-off mode of operation or other cause of voltage transients. When the reverse bias voltage across each switching stage rises, the respective diode D reacts accordingly so as to divert current through the diode, thus allowing excess charge on the pump capacitor C to be discharged and limiting the voltage across each switching stage.

It will be appreciated by those skilled in the art that the diodes D1-D4 will exhibit some reverse leakage current during normal operation, where they are reverse biased by 2Vin for about half the operating time. Therefore, the reverse leakage current characteristics of such diodes D are preferably chosen such that: during the normal mode operation the output bias voltage Vb of the charge pump is not significantly reduced; and during the power down/off mode of operation the stages CP1-CPN are discharged in a sufficient and predictable manner.

Figure 2A:
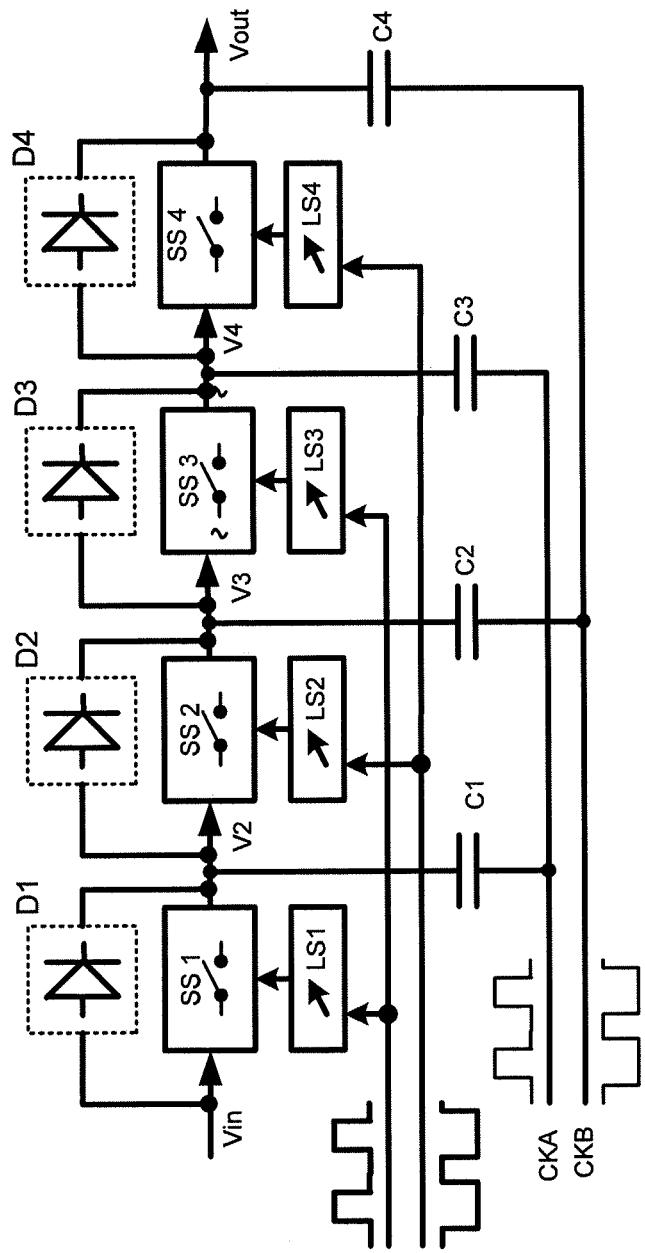
FIG. 2a illustrates a charge pump circuit according to an embodiment of the present invention.
Figure 2B:
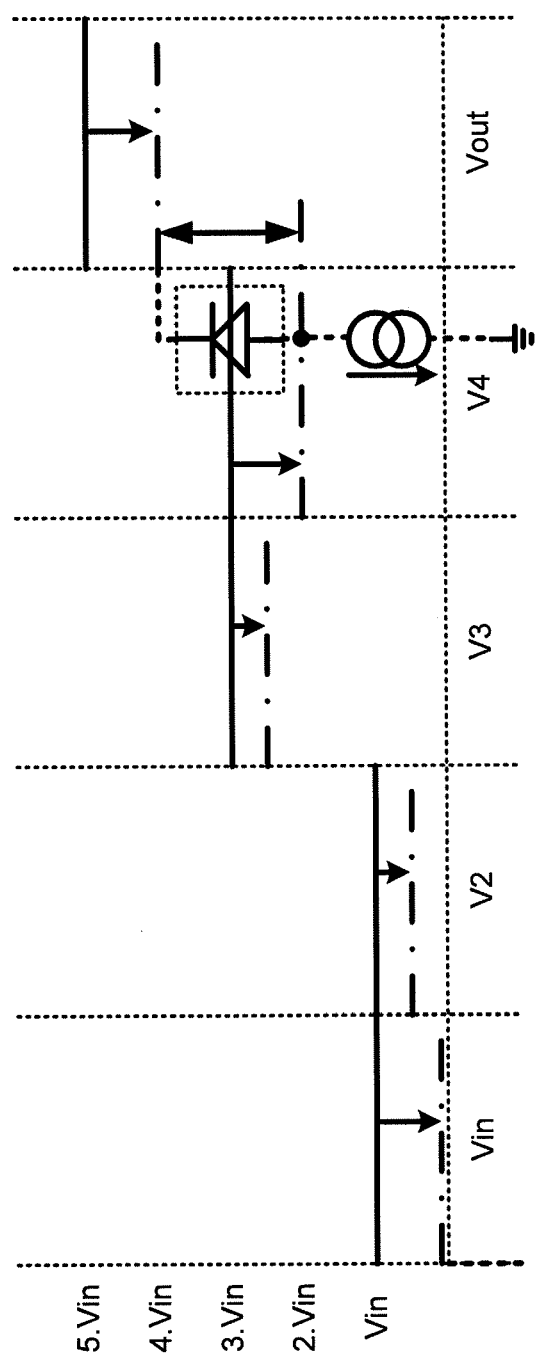
Figure 2C:
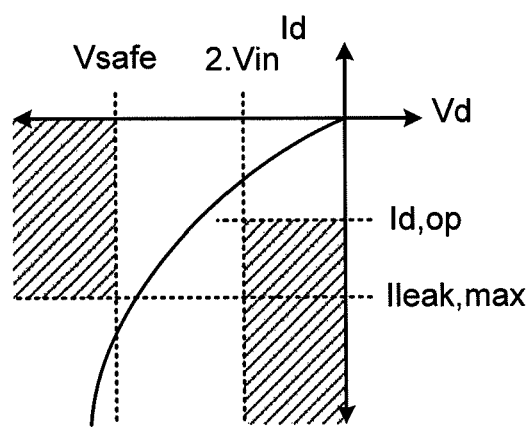
FIG. 2c illustrates the leakage characteristics of a diode suitable for use in the present invention.

FIG. 2c illustrates these constraints. When reverse biased by 2Vin, the diode must pass less than a current, Idmax, that is the maximum current that is tolerable in terms of lack of efficiency or potentially limiting the output voltage by approaching the current delivering capability of the capacitors at the normal clock frequency. On the other hand, the diode must pass the maximum expected extraneous pull-down leakage current Ileak before reaching a voltage Vsafe corresponding to the maximum permissible voltage stress across the switching stage before reliability is compromised.

Figure 3A:
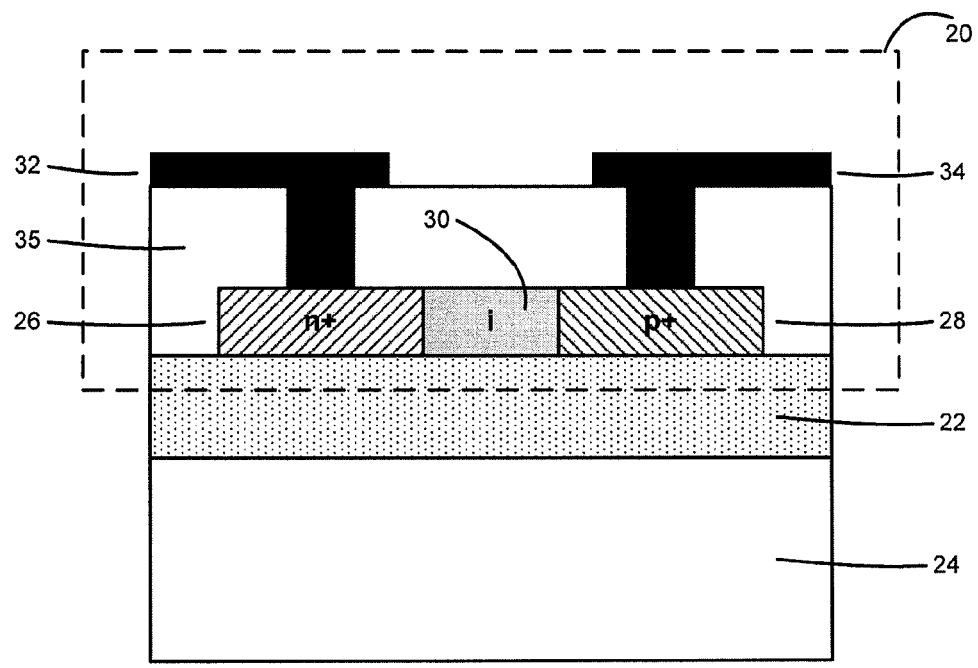
FIG. 3a illustrates a poly diode suitable for use in the present invention.

A suitable diode, which has the above mentioned characteristics, is a polysilicon diode. FIG. 3a shows a known structure of such a polysilicon diode element 20 (referred to hereinafter as a "poly diode").

The poly diode element 20 is disposed on a silicon dioxide layer 22, previously disposed on a silicon substrate 24. The poly diode element 20 itself comprises an n-type region 26 forming a p-n junction with a p-type region 28. If the n-type and p-type polysilicon regions are touching, low reverse breakdown voltages and/or high leakage of current are observed, as the n- and p-type regions 26, 28 are polycrystalline, creating effects at the grain boundaries. The low reverse breakdown voltages and/or high leakage of current can be adjusted by interposing an intervening drift region 30 of substantially intrinsic semiconductor material.

The n-type region 26 is electrically connected to an electrode 32, and the p-type region 28 is electrically connected to another electrode 34 through contact holes etched in an overlying insulating dielectric layer 35.

Typically this structure will be manufactured by first depositing a layer of intrinsic material, etching away superfluous material to leave a polysilicon region for the whole diode, than selectively implanting or diffusing n or p dopant on the respective portions of this intrinsic material. The insulating layer 35 is then deposited, and holes etched into it to accommodate the vertical elements of the metal electrodes 32, 34 which are then deposited to fill the holes and in patterns on the surface to connect with other circuit elements (not illustrated).

Figure 3B:
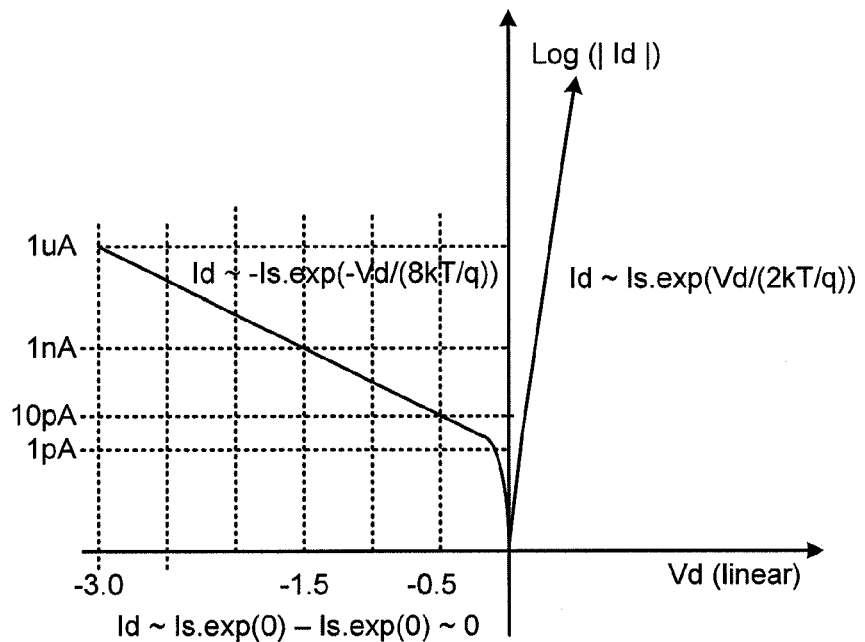

FIG. 3b shows the current-voltage curves for a typical poly diode such as shown in FIG. 3a. In forward bias, the current asymptotes to $Is.exp(Vd/(2.kT/q))$, so $Vd=(2kT/q)ln(|Id|)$. In reverse bias, the current asymptotes to $Is.exp(Vd/(8.kT/q))$ so $Vd=(8kT/q)ln(|Id|)$. At zero bias these current components cancel to give zero net current.

For a convention silicon pn diode, where the current $Id=Is.exp(Vd/(kT/q))$, the current Id increases by a factor of 10 for every 60 mV increase in Vd. For a reverse biased poly diode such as shown in FIG. 3a, since $Id=Is.exp(Vd/(8.kT/q))$, the extra factor of 8 in the exponent leads to the poly diode requiring a near 500 mV increase in applied voltage Vd to increase current by a factor of 10. The saturation current Is of a typical p-i-n (or n-i-p) poly diode is of the order of 1 pA, so it only leaks 10 pA by Vd~500 mV and 1 nA by Vd~1.5V, and 1 μA by Vd=3.0V. Thus the use of a reverse biased poly diode DR enables a controlled reverse leakage current to be obtained.

A poly diode, having the characteristics shown in FIG. 3b, would be suitable for an application where Vin=0.75V, using 0.18 μm transistors with a reliability limit Vsafe of 3V across them. The operating leakage current would be 1 nA at 1.5V Vd, yet the diode could clamp currents of up to 1 μA to 3V.

The diode clamps may comprise a single poly diode, or a plurality of poly diodes electrically connected to achieve a desired operating characteristic. When using a plurality of poly diodes to obtain a particular reverse leakage current characteristic, the poly diodes may comprise a series of individual poly diodes connected in series.

Figure 3C:
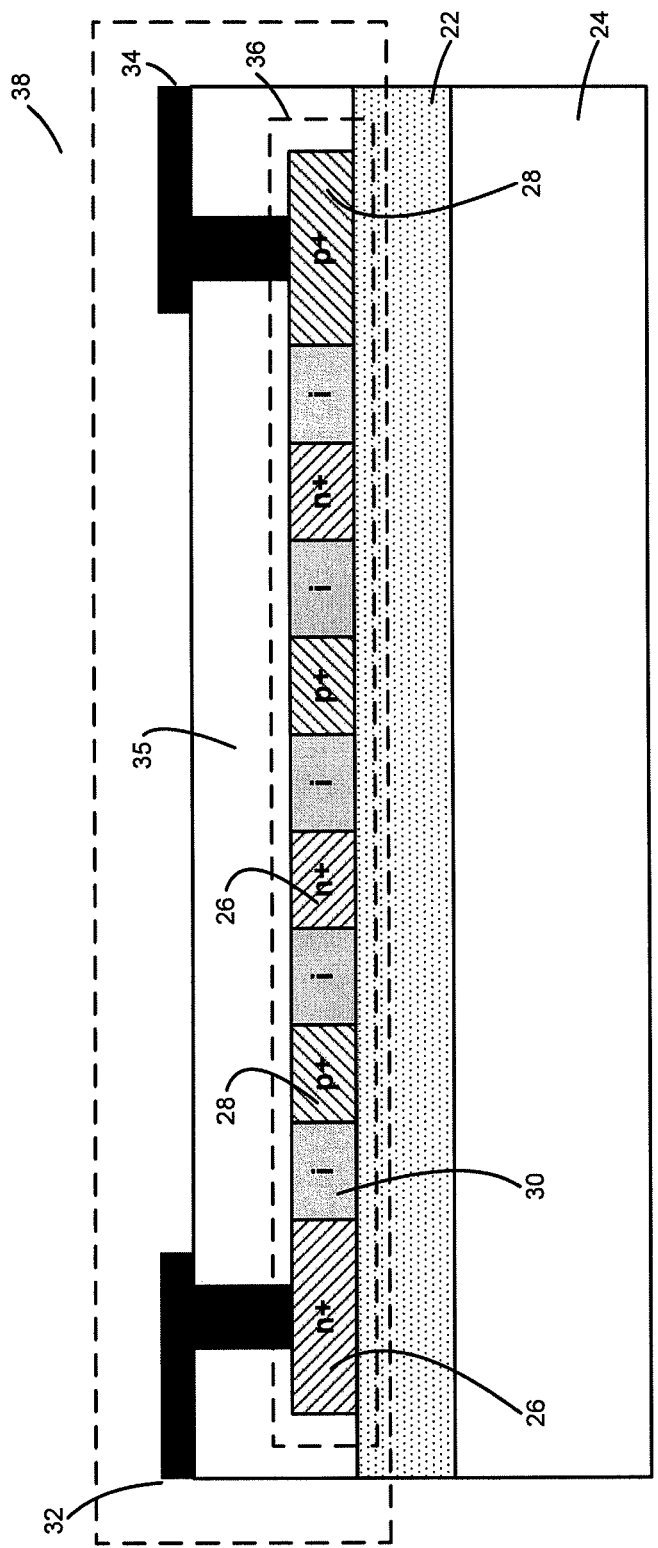
FIG. 3c shows a composite poly diode suitable for use in the present invention.

For example if each diode clamp consisted of two poly diodes in series, each with the I-V characteristic of FIG. 3c, then the overall clamp would pass the stated currents with double the respective applied voltages. Thus the clamp would pass 1 nA with 3V applied, 1 μA with 6V applied, rendering it suitable for use in a low-current charge pump with Vin=1.5V, using 0.35 μm transistors with a reliability limit Vsafe of 6V across them. The operating leakage current would be 1 nA at 3V Vd, yet the diode could clamp currents of up to 1 μA while ensuring less than 6V was applied across the protected switch transistor.

The diode may also comprise a composite poly diode, having a continuous strip of polysilicon with a plurality of p-n (or n-p) junctions arranged to form a series of poly diode elements on a single substrate. Such a composite diode structure is described in more detail in our co-pending application, applicant's reference P1200 GB00 (P111707 GB00). FIG. 3c shows a composite diode 38 which could be used where similar elements have the same numerals as used in FIG. 5a. A continuous strip of polysilicon 36 comprises a plurality of doped regions having alternating n-type regions 26 and p-type regions 28. As mentioned above, direct junctions between n- and p-type regions can cause leakage, and therefore in the illustrated embodiment the n- and p-type regions are preferably separated by regions 30 of substantially intrinsic semiconductor material (for example, polysilicon). It is noted, however, that the regions 30 may have some degree of light doping.

Use of a composite poly diode as a leakage element in a diode clamp according to the present invention, either alone or connected to other diodes (whether single junction diodes such as shown in FIG. 3a or other composite diodes) allows the characteristics of the diode clamp to be tailored for the particular application. As mentioned above poly diodes are particularly suited to the present application due to their leakage characteristics.

It will be noted however that the invention is equally applicable to any semiconductor material for realising the diode, whether composite or otherwise, for example re-crystallised silicon or other semiconductor material(s), having a high impedance and capable of conducting the required reverse bias current.

Figure 1A:
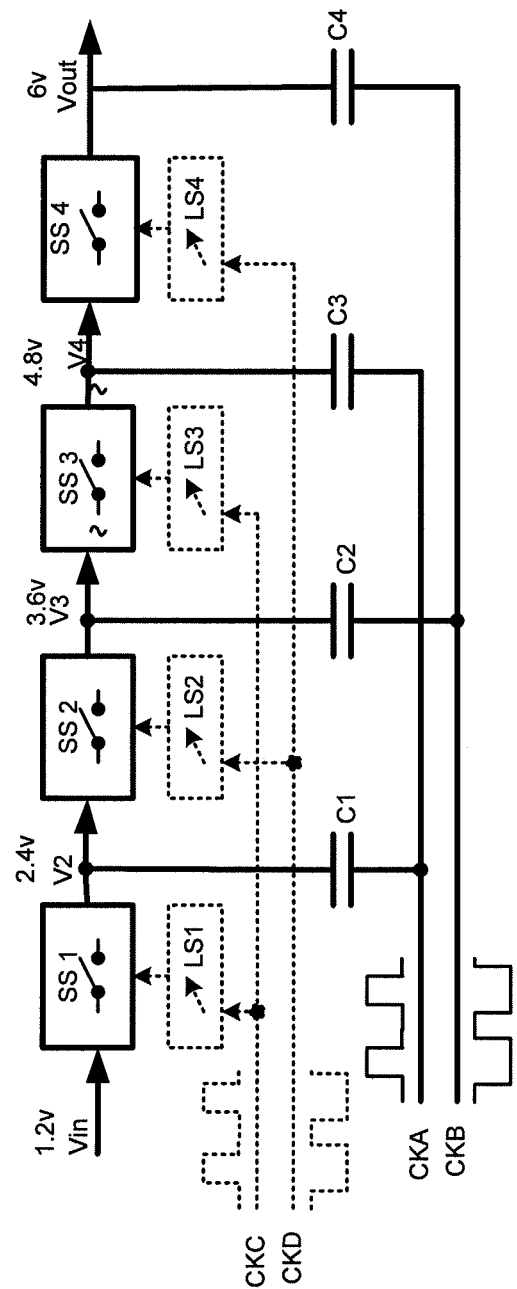
FIG. 1a illustrates an example charge pump circuit.
Figure 1B:
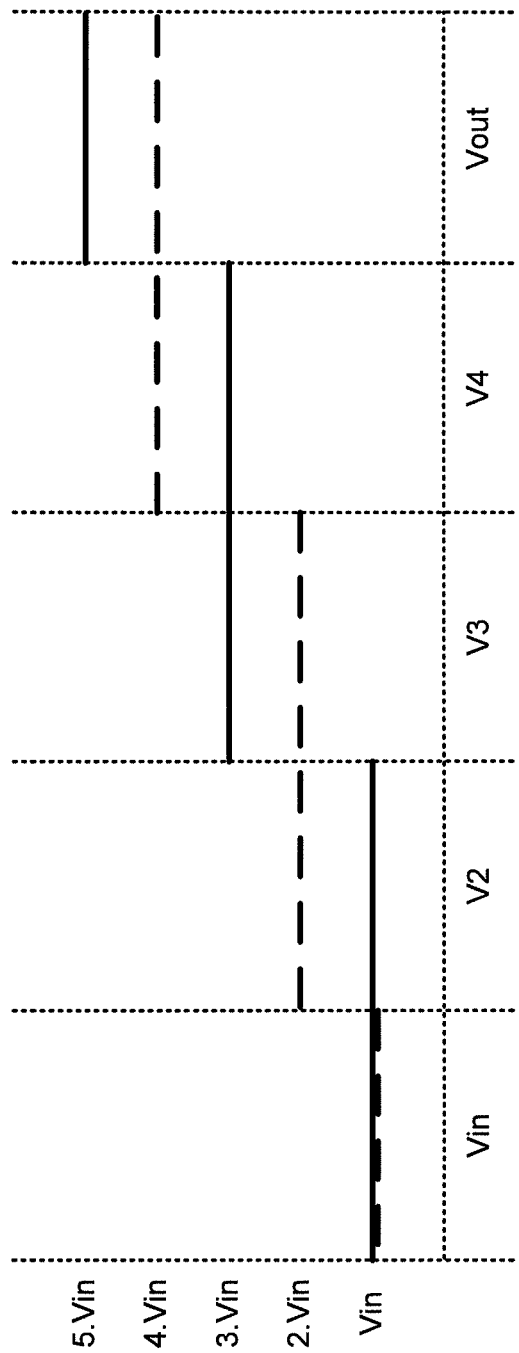
Figure 4:
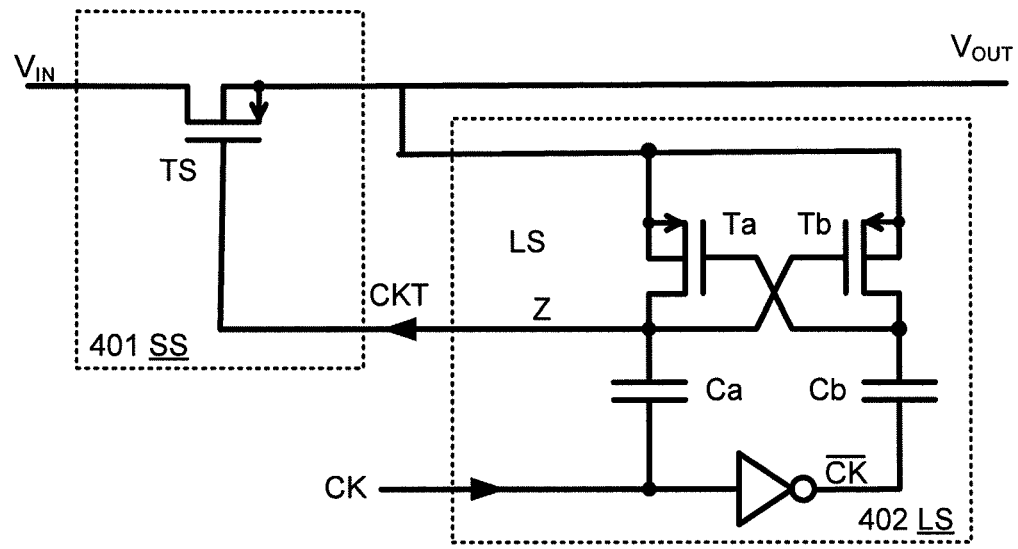
FIG. 4 illustrates a single stage of a charge pump showing the circuit associated with the switching and level shifting stages.

As mentioned above any voltage transients developed during power down may cause damage not only to the switching stages, SS1 to SS4 in FIG. 1a but also to the level shifting stages LS1 to LS4. FIG. 4 shows an example circuit associated with a single charge pump stage including a switching stage SS 401 and a level shifting stage LS 402 corresponding to those shown in FIG. 1a. The switching stage SS 401 comprises a pass PMOS transistor TS. The level shifting stage comprises PMOS transistors Ta, Tb and capacitors Ta and Tb and an inverter.

The switch transistor TS in the switching stage 401 may be protected from high voltages developed in power down situations and the like by connecting a diode in parallel with the transistor TS as described above. However there is also a desire to protect the circuitry of the level shifting cell 402.

The Level shifting cell 402 uses two non-overlapping, anti-phase clocks (CK and inverted CK). Transistors Ta and Tb are successively switched on and off in order to charge capacitors Ca and Cb to the input voltage. During certain modes of operation, for example a power-down mode of operation, the different rates of discharge in the various stages of the charge pump circuit can lead to the reverse breakdown voltage of transistors Ta and Tb being exceeded, thereby damaging the transistors Ta and TB.

Figure 5:
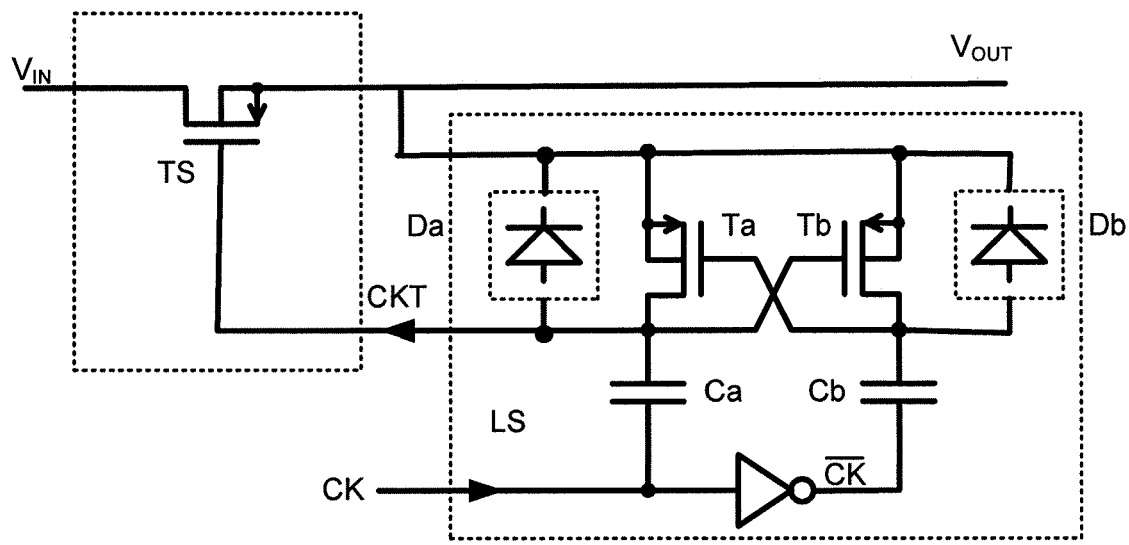
FIG. 5 illustrates an embodiment of the invention for protecting the level shifting stage.

FIG. 5 illustrates the circuit associated with a charge pump stage of FIG. 4 but with a means of protecting the transistors in the level shifting cell according to a another embodiment of the present invention. Respective diode clamps Da & Db are connected across switch transistors Ta & Tb. Each diode clamp comprises at least one diode, which may be a poly diode. The cathodes of diodes Da and Db are connected to the output voltage node and their anodes are connected to the high sides of the level shift pump capacitors Ca and Cb. In other words each diode is connected in parallel with its respective transistor and reverse biased with respect to current flow from Vout of the charge pump stage.

Again it is preferable that the diodes, Da and Db are leaky diodes. That is to say the diodes, Da and Db exhibit a relatively small reverse leakage current characteristics such that if a high voltage starts to develop at Vout, the respective diodes, Da and Db will discharge the relevant pump capacitor connected to Vout such that voltage across the transistors Ta and Tb does not exceed the breakdown voltage of the transistors. The diode clamps Da and Db therefore conveniently comprise one or more poly diodes.

The charge pump described above may be used in a variety of applications and in particular is suitable for generating a voltage required to bias a transducer such as a MEMS transducer like a microphone, as may be used in a portable device.

Figure 6:
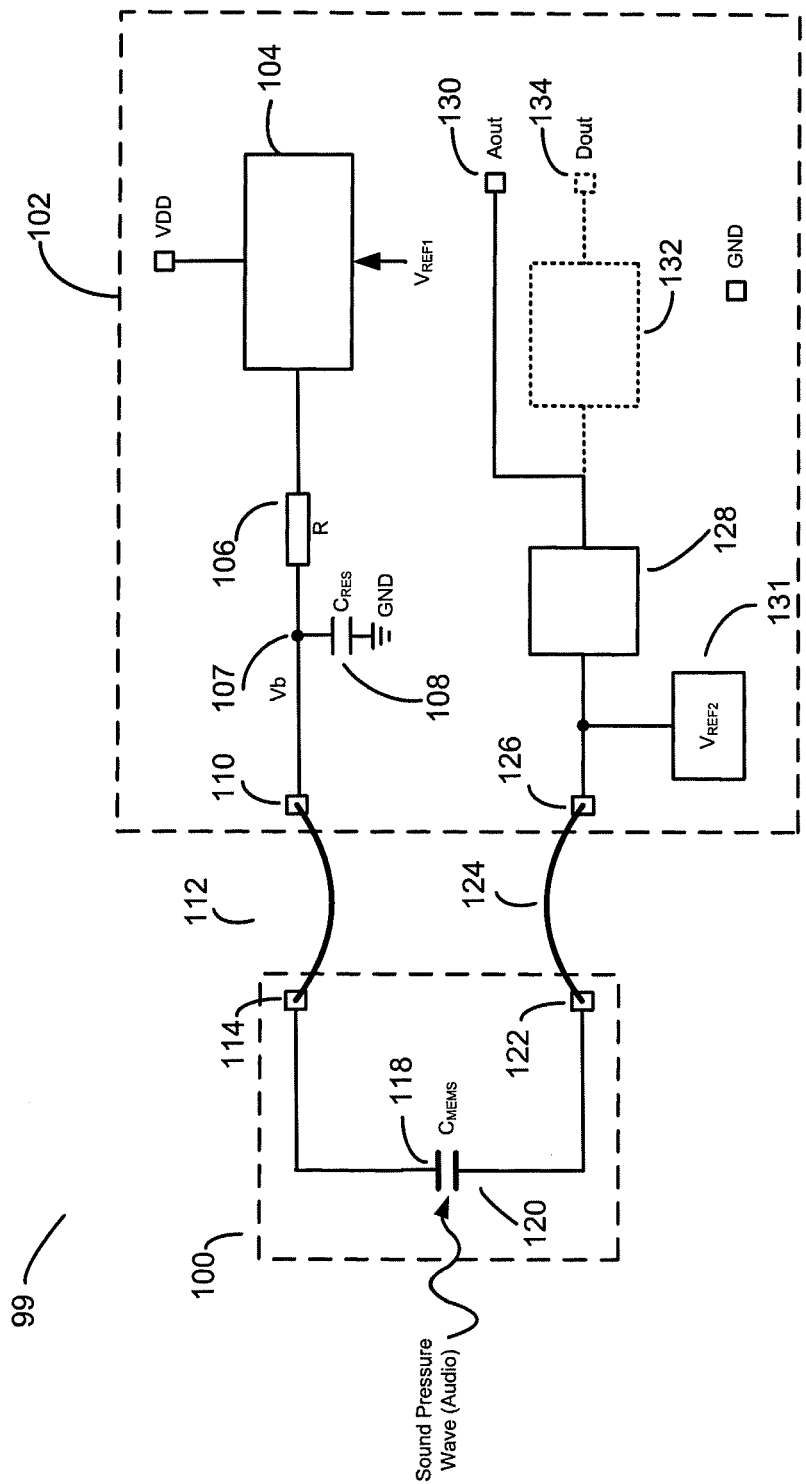
FIG. 6 illustrates the charge pump circuit of the present invention arranged to provide a biasing voltage for a MEMS transducer.

FIG. 6 shows how the charge pump circuit of the present invention could be implemented into a device and illustrates a schematic diagram of a MEMS device 99 comprising a MEMS transducer 100 and an electronic circuit 102. The MEMS transducer 100 is shown as being formed on a separate integrated circuit to the electronic circuit 102, the two being electrically connected using, for example, bond wires 112, 124. The MEMS transducer 100 comprises a MEMS capacitor $C_{MEMS}$ having first 118 and second 120 plates that are respectively connected to first 114 and second 122 bond pads.

The electronic circuit 102 comprises a charge pump circuit 104 according to the present invention, such as the one shown in FIG. 2a. The device circuitry also comprises a resistor 106 and a reservoir capacitor 108, an amplifier 128, a bias circuit 131, third 110 fourth 126 and fifth 130 bond pads and an optional digital-to-analogue converter (DAC) 132 with associated sixth bond pad 134.

However the charge pump may be used for any application requiring a voltage level to be supplied and for example could be used in biasing the gate of a MOS transducer. Thus the charging circuit could be used in a number of different devices including, but not limited to an ultrasound imager, a sonar transmitter and/or receiver, a mobile phone or other communication device, a personal desktop assistant, an MP3 player or other personal audio device or a laptop computer.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

What is claimed is:

1. A charge pump circuit having a plurality of stages comprising:
   at least one circuit component that comprises a transistor and that may be damaged by voltage transients above the normal operating voltages of the circuit, wherein said circuit component is part of a switching stage for switchably connecting a capacitor of one stage of the charge pump to a previous stage of the charge pump; and
   a leakage element electrically connected in parallel with said at least one circuit component so as to protect said circuit component from voltage transients above the normal operating voltages of the circuit, wherein said leakage element is configured to prevent a voltage difference developing across the transistor which is greater than the breakdown voltage of the transistor;
   wherein said leakage element is arranged to be reverse biased when said one stage of the charge pump is at a higher voltage than said previous stage of the charge pump.

2. A circuit as claimed in claim 1 wherein said leakage element is adapted to allow a leakage current to flow at a voltage below the breakdown voltage of the transistor.

3. A circuit as claimed in claim 1 wherein said transistor has a breakdown voltage less than the voltage output of the charge pump circuit.

4. A circuit as claimed in claim 1 wherein the leakage element is adapted to allow a leakage current of more than 100 pA or more than 1 nA or more than 10 nA or more than 100 nA at a voltage less than the breakdown voltage of the transistor.

5. A circuit as claimed in claim 1 wherein the leakage element is adapted to allow a leakage current of more than 100 pA or more than 1 nA or more than 10 nA or more than 100 nA at a voltage which is substantially the breakdown voltage of the transistor.

6. A circuit as claimed in claim 1 wherein the leakage element is adapted to allow a leakage current of less than 1 µA or less than 100 nA or less than 10 nA at the normal maximum operating voltage.

7. A circuit as claimed in claim 1 wherein said leakage element comprises a polysilicon diode.

8. A circuit as claimed in claim 7 wherein said leakage element comprises a p-i-n diode.

9. A circuit as claimed in claim 7 wherein said polysilicon diode comprises a multiple junction composite diode.

10. A circuit as claimed in claim 9 wherein said multiple junction composite diode comprises a continuous structure of polysilicon comprising a plurality of regions of first semiconductor type, being n type or p type, and at least one region of a second semiconductor type, being n type or p type and the opposite type to the first type, the regions of first semiconductor type and second semiconductor type being arranged alternately.

11. A circuit as claimed in claim 10, wherein said continuous structure further comprises a plurality of regions of a third semiconductor type, said third semiconductor type being one or more of substantially intrinsic, lightly doped p-type or lightly doped n-type, arranged between respective regions of first semiconductor type and regions of second semiconductor type.

12. A circuit as claimed in claim 9 wherein said multiple junction composite diode comprises a plurality of regions of second semiconductor type.

13. A circuit as claimed in claim 1 wherein said leakage element comprises a plurality of diodes electrically connected across said circuit component.

14. A circuit as claimed in claim 13 wherein said plurality of diodes are electrically connected in series.

15. An apparatus having a charging circuit as claimed in claim 1 wherein the apparatus is one of an ultrasound imager, a sonar transmitter and/or receiver, a mobile phone or other communication device, a personal desktop assistant, an MP3 player or other personal audio device or a laptop computer.

16. A circuit as claimed in claim 1 wherein at least one said circuit component is a transistor which is part of a level shifting cell.

17. A circuit as claimed in claim 1 having a plurality of transistors, wherein each of said plurality of transistors is electrically connected in parallel with a leakage element.

18. A circuit as claimed in claim 1 wherein the output of charge pump is electrically connected to a biasing circuit for biasing a device.

19. A circuit as claimed in claim 18 wherein said device is a transducer.

20. A circuit as claimed in claim 19 wherein said transducer is a MEMS microphone.

21. A method of protecting a circuit component in a charge pump having a plurality of stages from voltage levels higher than normal operating voltages comprising the step of arranging a leakage element in parallel with said circuit component, wherein the circuit component comprises a transistor, which is part of a switching stage for switchably connecting a capacitor of one stage of the charge pump to a previous stage of the charge pump, and the leakage element is configured to prevent a voltage difference developing across the transistor which is greater than the breakdown voltage of the transistor, wherein said leakage element is arranged to be reverse biased when said one stage of the charge pump is at a higher voltage than said previous stage of the charge pump.

22. A method as claimed in claim 21 wherein said transistor has a breakdown voltage less than the voltage output of the charge pump circuit.

23. A method as claimed in claim 21 wherein said leakage element comprises a polysilicon diode.

24. A method as claimed in claim 23 wherein said leakage element comprises a pin diode.

25. A method as claimed in claim 23 wherein said polysilicon diode comprises a multiple junction composite diode.

26. A method as claimed in claim 25 wherein said multiple junction composite diode comprises a continuous structure of semiconducting material comprising a plurality of regions of first semiconductor type, being n type or p type, and at least one region of a second semiconductor type, being n type or p type and the opposite type to the first type, the regions of first semiconductor type and second semiconductor type being arranged alternately.

27. A method as claimed in claim 21 wherein said leakage element comprises a plurality of diodes connected in series and/or parallel.

* * * * *